Sept. 19, 1972  D. ANDRYCHUK  3,692,499

CRYSTAL PULLING SYSTEM

Filed Aug. 31, 1970  6 Sheets-Sheet 1

INVENTOR
Dmetro Andrychuk
BY
Gary C. Honeycutt
ATTORNEY

WITNESS

United States Patent Office 3,692,499
Patented Sept. 19, 1972

3,692,499
CRYSTAL PULLING SYSTEM
Dmetro Andrychuk, Richardson, Tex., assignor to Texas Instruments Incorporated, Dallas, Tex.
Filed Aug. 31, 1970, Ser. No. 68,282
Int. Cl. B01j 17/18
U.S. Cl. 23—301                 18 Claims

ABSTRACT OF THE DISCLOSURE

There is disclosed a new method and apparatus for the controlled pulling of crystal rods for use in semiconductor component manufacturing. Changes in the diameter of the crystal rod are monitored by opto-electrically detecting changes in the physical location of a halo surrounding the rod at an interface between the rod and the molten material from which it crystallizes. A linear electrical signal is produced by a monitoring device for use in controlling the parameters affecting crystal diameter during the pulling process. An electrical signal proportional to changes in the level of the molten material within the crucible is also produced by the monitoring device.

This invention relates to a method and apparatus for the growing of crystal rods for use in semiconductor component manufacturing, and more specifically to a system for producing rods of accurately controlled cross-sectional dimensions.

Failure to accurately control the diameter of a crystal rod as it is being pulled from a melt results in expenses brought about by the requirement of grinding, waste of material ground away, spoiling of the product brought about by grinding, and rejection of undersized product. There is a need for a device to accurately monitor the diameter of a crystal rod as it is being pulled, such as in a Czochralski crystal puller. A signal produced by such a device can be used to control the parameters that affect the diameter of the crystal rod during the growth process.

One approach that has been used in the past is the use of an active light source and a viewing screen to monitor the rod diameter by viewing the domical projection forced through an aperture in a silica disc floating on the melt. Disadvantages of this method include: the silica disc floating on the melt may be a source of contamination; an error in the diameter monitor signal is introduced if the crystal wobbles as it is being pulled and rotated; changes in the level of the melt within the crucible will introduce errors; and cylindrical asymmetry in the rod will introduce errors.

Another approach has been the use of an X-ray device. The monitor signal produced by this latter device will be affected by asymmetry of the crystal rod, and this device has the additional unwanted feature of requiring shielding to protect the operator of the crystal puller from radiation.

Still another approach makes use of a radiation detector that senses the radiation from a point on the melt surface near the crystal rod and provides an output proportional to the amount of radiation sensed. Asymmetry and wobble of the crystal rod will introduce errors in this diameter monitoring device. When the diameter of the rod changes, the output of the device is a new reading proportional to the new intensity, as opposed to a true error signal. The use of a single detection piont limits the range of diameter control. Since the detection point defines a point on the intensity distribution curve measured radially outward from the crystal, the linearity of the output signal depends upon the point on the curve that is selected. When the melt temperature changes the intensity of the radiation changes. Since the device monitors with respect to an initial fixed intensity, the accuracy of this monitoring device is critically dependent upon maintaining a constant melt temperature.

A halo of light occurs at the region where the crystal rod is growing out of the melt. For silicon, the spectral distribution of the radiation from the halo extends from the near ultraviolet through the visible region into the far infrared, with the peak in the near-infrared region. The relative intensity distribution of the light across the halo has been found to be consistent enough to warrant its use in a detection device. As the crystal rod diameter changes, the halo position changes, thus changing the location of a detection point on the distribution curve. The use of a plurality of detection points enables an error signal of a desired shape to be simulated. Further analysis and experimentation has revealed that it is advantageous to detect intensity changes at more than one location around the halo, and that this method of detection can be used to monitor changes in the melt level. Since the halo radiation peaks in the infrared region, the monitoring device is called an Infrared Optical Diameter Sensor. As used hereinafter, the term "halo" refers to a narrow band of high intensity radiation forming a ring around a crystal rod at the melt interface.

The present invention makes use of a plurality of monitors each comprised of a plurality of radiation sensing devices. The sensing devices of each monitor are arranged at equal fixed distances apart along a radial line extending through the center of an image of the halo. The outputs of the plurality of devices are combined to produce an error signal of a desired shape. The use of a plurality of devices produces a more reliable error signal, and enables the range of diameter control to be determined by arrangement of the sensor devices. The error signal produced is a true "error" signal, as opposed to a new fixed output, thus facilitating control. The use of a plurality of detection points spread across the relative intensity distribution curve minimizes the effect of melt temperature changes. Additionally, the use of a plurality of monitors further increases the reliability of the resultant error signal and makes it possible to eliminate or reduce effects of crystal wobble and asymmetry.

Accordingly, it is an object of this invention to provide a new method and apparatus for accurately monitoring changes in the diameter of a crystal rod as it is being pulled.

Another object of this invention is to provide a method and apparatus that produces a linear electrical signal that is directly proportional to changes in the diameter of a growing crystal rod.

Still another object of the invention is to provide such a method and apparatus that is relatively unaffected by crystal rod asymmetry, melt level changes, and wobble of the crystal rod.

As a crystal rod is being pulled from molten material within a crucible, the level of the melt will drop. The gradually dropping interface level affects the growth rate of the crystal, and also changes the heat distribution within the melt, which adversely affects the quality of the crystal. Changes in melt level may also affect crystal rod diameter monitoring devices. Thus it is desirable to keep the melt level constant, as by controlling the rate of the crucible lift mechanism. The intense heat inside the growing chamber, on the order of 1400° C., as well as smoke and gaseous vapor make it extremely difficult to accurately monitor the melt level.

Accordingly, it is an object of this invention to provide a new method and apparatus for monitoring changes in the melt level.

Other objects, features and advantages of the invention will become more apparent from the following description of a preferred embodiment thereof in connection with the accompanying drawings, in which.

Figure 2:
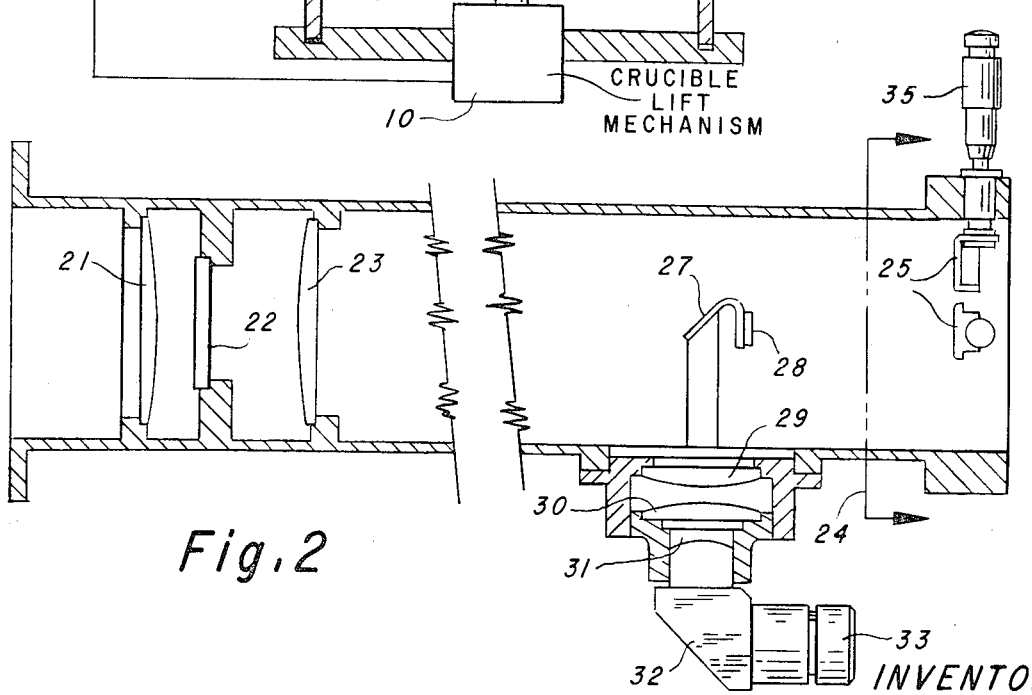
FIG. 2 is schematic view of the optical system used to direct the halo image upon the monitors in the preferred embodiment.
Figure 2B:
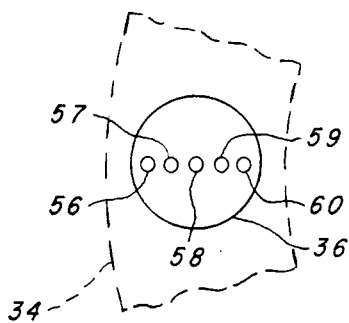
FIG. 2a is a cross-section view of the device of FIG. 2.
Figure 2A:
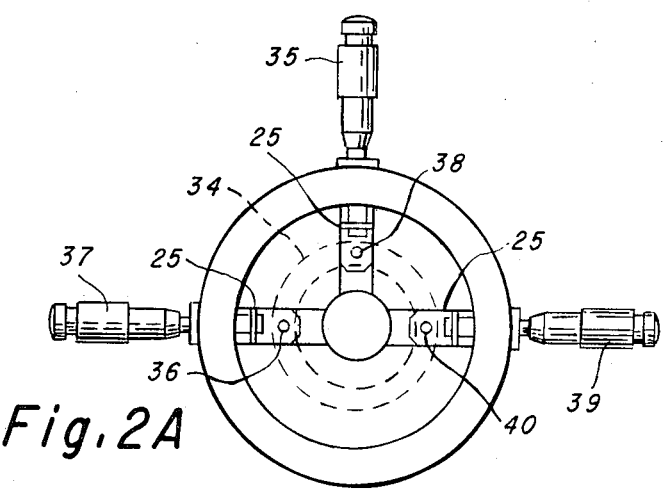

FIG. 2b s an expanded view of one of the monitors of FIG. 2a.

Figure 3:
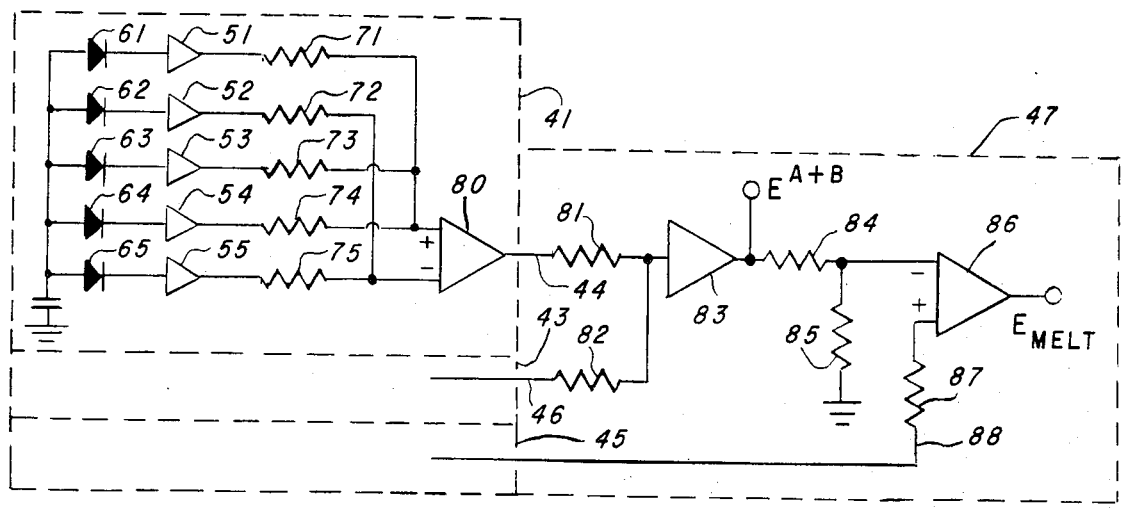

FIG. 3 is a circuit schematic of the electronics employed in the present invention.

Figure 4:
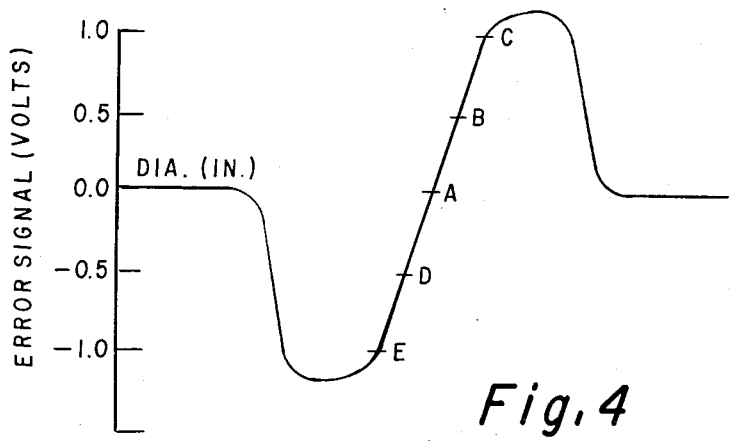

FIG. 4 is the shape of the error signal simulated by the preferred embodiment.

Figure 5:
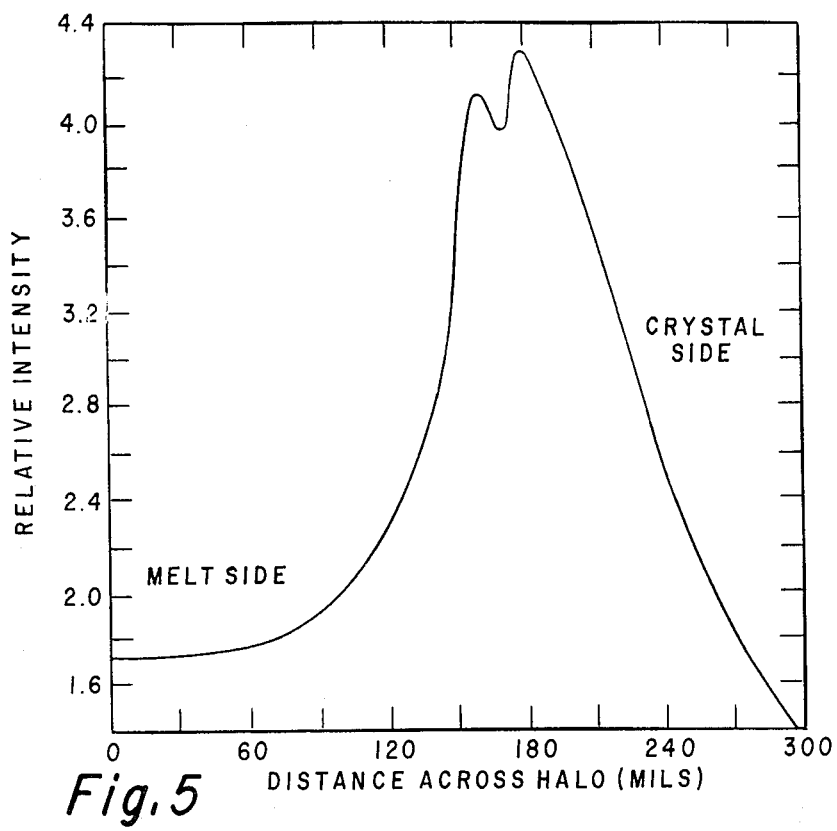

FIG. 5 is a plot of the relatively intensity distribution of the radiation from the halo.

Figure 5A:
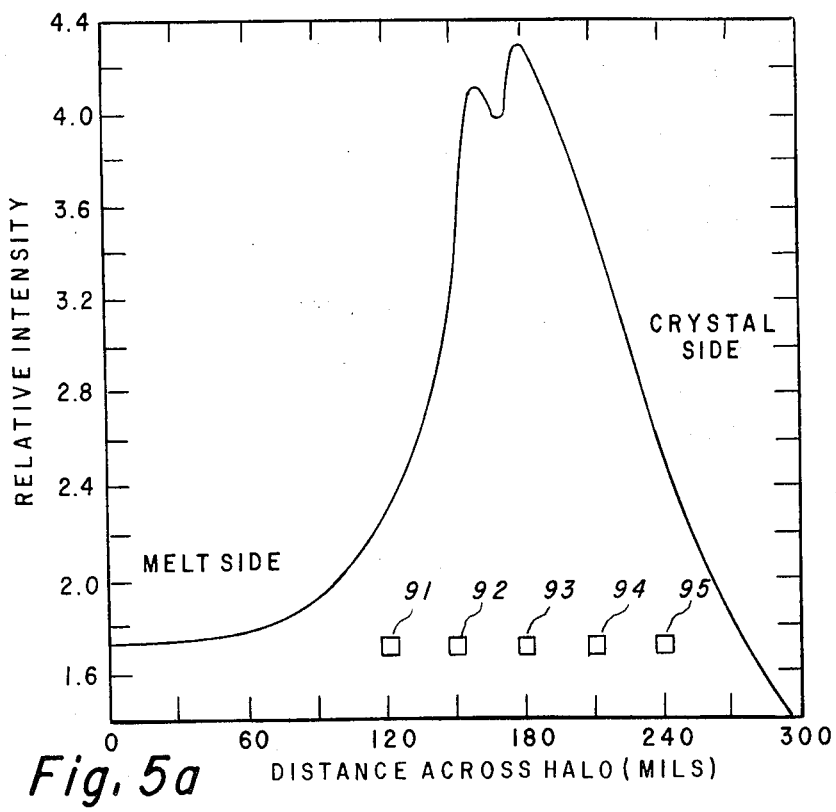

FIG. 5a is the plot of FIG. 5 with the five sensor diodes of a monitor superimposed thereon.

Figure 5B:
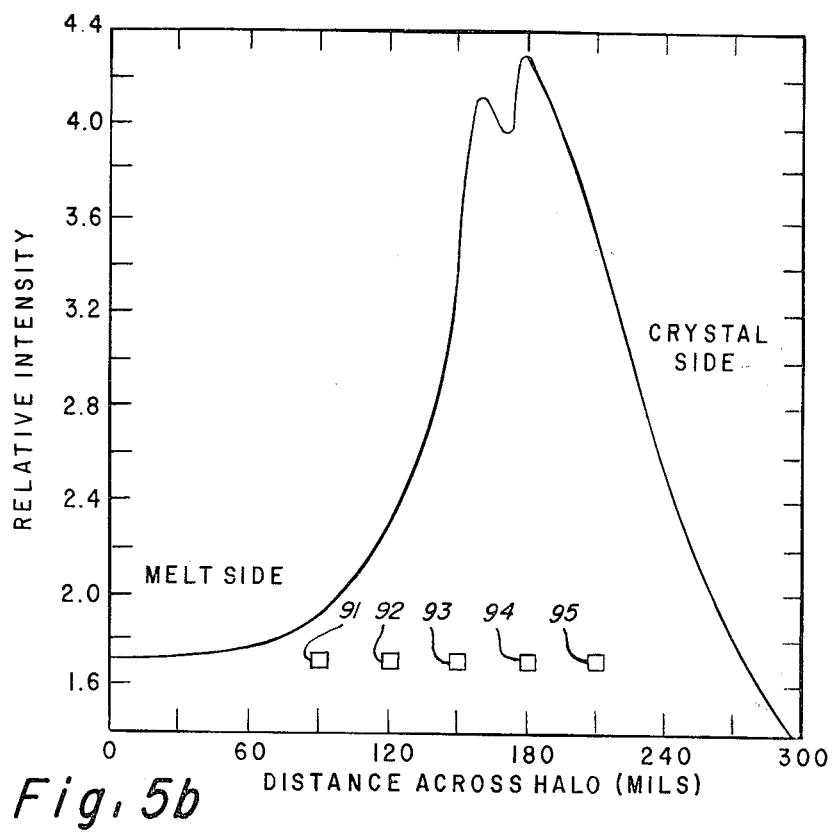

FIG. 5b is the plot of FIG. 5a with the sensor diodes changed in position so as to simulate a change in the diameter of the crystal rod.

Figure 6:
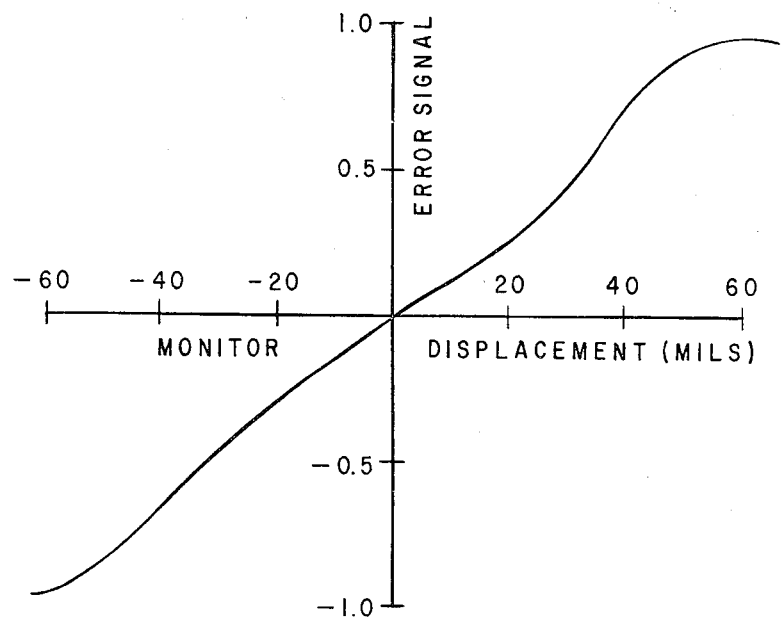

FIG. 6 is a plot of the error signal actually generated by one of the monitors in the preferred embodiment.

Figure 7:
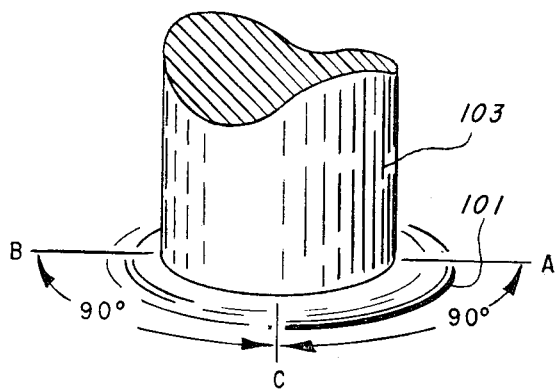

FIG. 7 is a view of the halo surrounding the crystal rod, showing the respective locations of the three monitoring points in the preferred embodiment.

Figure 8:
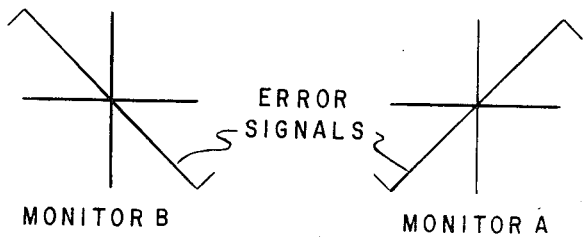

FIG. 8 shows the general shape of the error signals of two of the monitors in the preferred embodiment.

Figure 9:
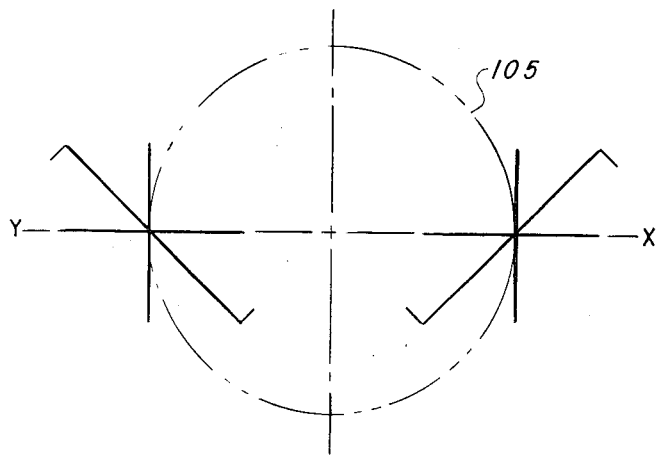

FIG. 9 shows the error signals of FIG. 8 superimposed upon a cross-section view of a crystal rod.

Figure 10:
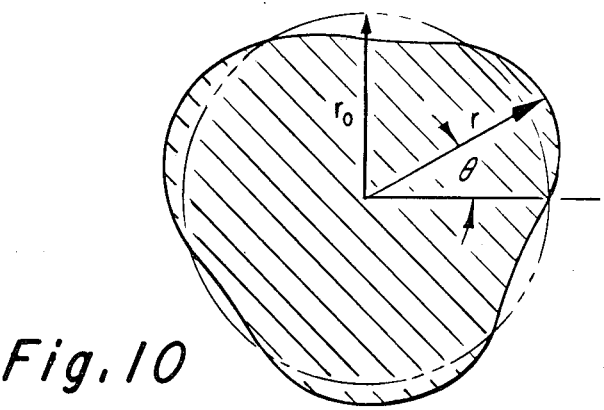

FIG. 10 is a cross-section view of a crystal rod revealing asymmetry.

Figure 11:
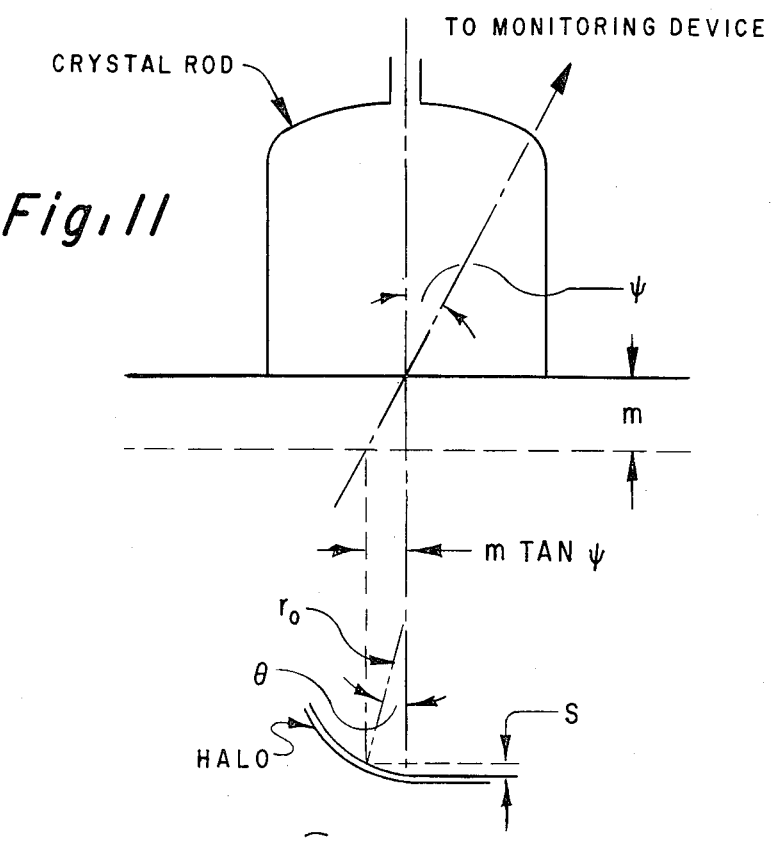

FIG. 11 is a view of the crystal rod at the melt interface demonstrating the effect of changes in melt level on the monitoring device.

Figure 12:
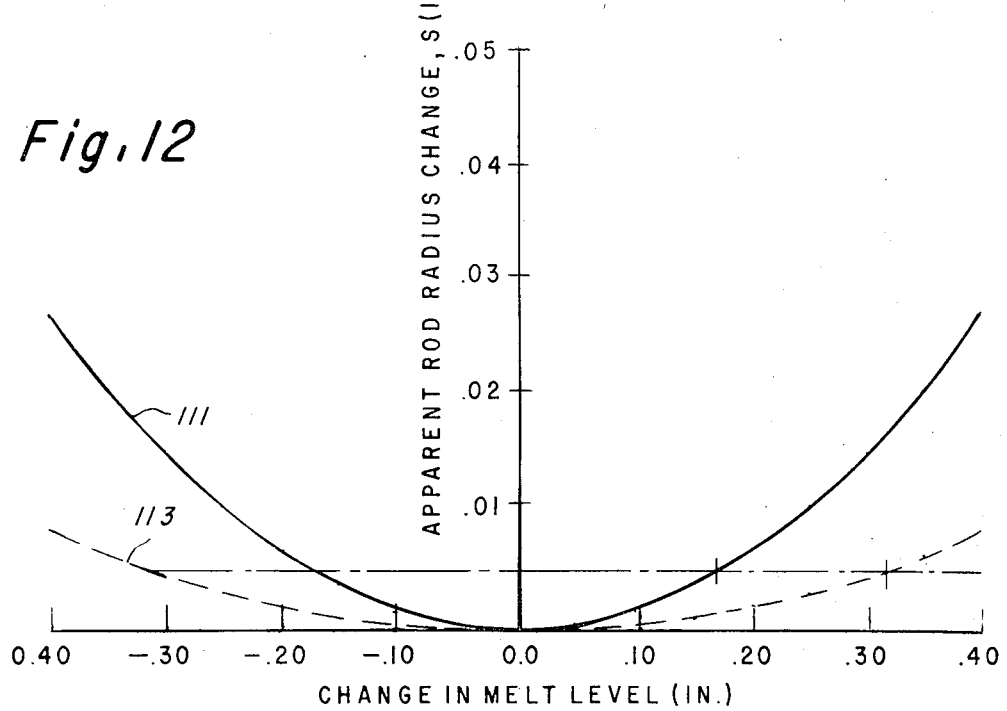

FIG. 12 graphically shows the effect of melt level changes upon the composite error signal of two of the monitors in the preferred embodiment.

Figure 1:
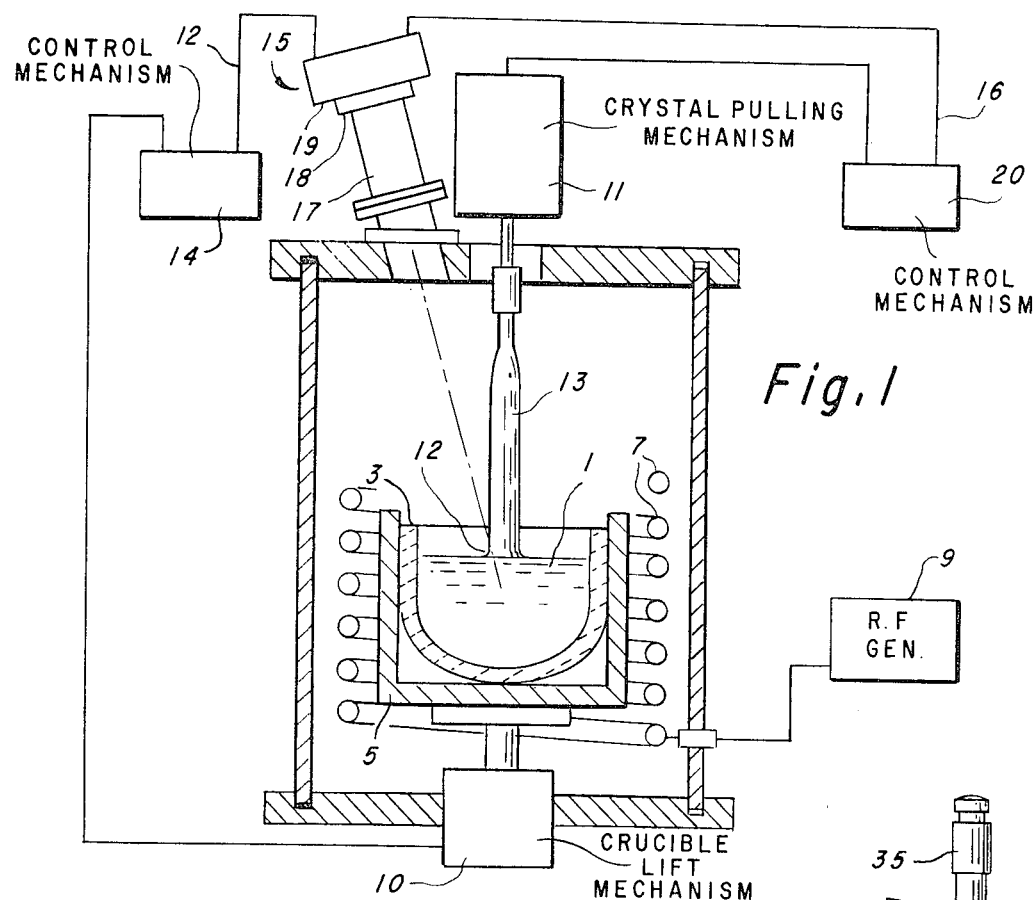
FIG. 1 shows a cut-away view of a crystal puller of the Czochralski type, employing the present invention.

Referring now to FIG. 1, a view of a crystal puller of the Czochralski type is shown. Molten silicon 1 is contained in quartz crucible 3 surrounded by a graphite susceptor 5. Heat is supplied by way of radio frequency induction coils 7 controlled by RF generator 9. A crystal pulling mechanism 11 is provided for pulling a crystal rod 13 from the melt 1. A crucible lift mechanism 10 is provided for raising crucible 3 so as to keep the level of molten silicon 1 constant as crystal rod 13 is being pulled. A monitoring device 15 is shown properly mounted at a relatively slight angle from the vertical, directed at the interface 12 between the crystal rod 13 and molten silicon 1, i.e., the position of the halo. Monitoring device 15 produces two electrical control signals, one proportional to changes in the diameter of the crystal rod and the other proportional to changes in the level of the silicon melt. These signals can be used to automatically control, or to facilitate manual control of, the crystal pulling process. Control mechanism 20 responds to diameter control signal 16 from monitoring device 15 to control pulling mechanism 11, thus to attain a constant diameter crystal. Control mechanism 14 responds to melt level control signal 12 to control crucible lift mechanism 10, thus to keep melt level constant. Control mechanisms 14 and 20 can be of any suitable type, such as electro-mechanical devices or a properly programmed digital computer with requisite peripherals. It is recognized that an alternate method of controlling diameter is to vary melt temperature, but it is assumed for the purposes of this disclosure that melt temperature is held constant.

Monitoring device 15 is shown as comprised of three functional sections 17, 18 and 19. Optical section 17 focuses radiation from the halo located at interface 12 upon opto-electrical sensor devices in section 18. The electrical outputs of these sensor devices are combined in electrical section 19 to produce the desired control signals.

Referring now to FIG. 2, a schematic view of the optical system employed in the preferred embodiment is shown. Field lenses 21 and 23 are of appropriate focal length to focus radiation from the halo and form an image thereof upon section 18. Adjustable iris 22 is used to control the amount of light directed upon lens 23. The lens system comprised of elements 27–33 permits observation of the halo image upon sensors located on adjustable mounts 25 in section 18. Lens 28 focuses light from the halo image upon mirror 27. Light reflected by mirror 27 is focused by lenses 29, 30 and 31 upon mirror 32. The image formed at mirror 32 is observed through adjustable eyepiece 33. FIG. 2a shows a cross-section view taken at section line 24 of FIG. 2. Micrometer screws 35, 37 and 39 control adjustable mounts 25. This permits positioning of the sensor devices exactly over the halo image, and enables adjustment for crystal rods of desired nominal diameters. Initial adjustment is made for zero error signal at the desired diameter. Note halo image 34 as positioned upon monitors 36, 38 and 40. FIG. 2b shows an expanded view of monitor 36 and the corresponding section of halo image 34. Note the arrangement of sensor devices 56–60 of monitor 36. The use of three monitors each comprised of five sensor devices is somewhat arbitrary, but is described herein as the arrangement in the preferred embodiment for reasons which will become apparent.

Referring now to FIG. 3, a schematic of the electronic circuitry used in the preferred embodiment is shown. The circuitry consists of functionally identical sections 41, 43 and 45 and a common section 47. The number and arrangement of the individual components in FIG. 3 depends largely upon the error signal to be simulated. Therefore a more detailed description of FIG. 3 shall be made hereinafter.

As the crystal rod diameter changes, the position of the halo with respect to the fixed position of an opto-electrical sensor device changes, the intensity of the light striking the sensor changes, and so the electrical output changes. The outputs of a plurality of these sensors can be combined to generate an error signal of almost any desired shape. The shape of the error signal selected for the preferred embodiment is shown in FIG. 4. Referring to FIG. 4, note that the error signal is linear and directly proportional to changes in the crystal rod diameter in the region from E to C. The outputs of the five sensors of each monitor are combined to generate this error signal.

The intensity distribution of the radiation in the halo image for silicon was measured, and plotted as shown in FIG. 5. Referring to FIG. 5, the abscissa represents the distance across the halo in thousandths of an inch, with the halo edge on the melt side as reference. The ordinate represents the relative intensity of the radiation. Referring now to FIG. 5a, the curve of FIG. 5 is shown but now with the positions of the five sensors superimposed along the abscissa, thus to represent the physical location of the sensors across the image. The sensor locations in FIG. 5a are numbered 91–95. For the sensors positioned as shown in FIG. 5, the sensor outputs are designated $$x_{11}, x_{21}, x_{31}, x_{41}, x_{51}$$

where the first subscript refers to the sensor, numbered left to right, and the second subscript refers to the position of the halo with respect to the sensor. Thus $x_{11}$ represents sensor 91 located at position 120 mils, $x_{21}$ represents sensor 92 located at position 150 mils, etc. The fraction of each sensor output that must be combined with the other sensor outputs is a weighing factor $w_i$, where the subscript $i$ refers to the $i$-th sensor. Thus the combined weighted outputs comprise the error signal.

For the sensors positioned across the halo as shown in FIG. 5a, let the error signal be zero, thus corresponding to point A on the curve of FIG. 4. The following equation results $$w_1x_{11}+w_2x_{21}+w_3x_{31}+w_4x_{41}+w_5x_{51}=0 \quad (1)$$

The values of $x_{j1}$ are read from the curve of FIG. 5a. Referring to FIG. 5a, note that for sensor 91 the relative intensity is 2.31 units, for sensor 92 it is 3.40 units, etc. Equation 1 then becomes $$w_1(2.31)+w_2(3.40)+w_3(4.30) \\ +w_4(3.56)+w_5(2.53)=0 \quad (2)$$

Now let the halo move to the right a distance equal to the separation between the sensors. For this example the distance is 0.030 of an inch, as observed from FIG. 5a. Referring now to FIG. 5b the new locations of the sensors are shown superimposed upon the curve of FIG. 5. The sensor outputs can be read from the curve as before. Let the value of the error signal at this position be equal to $-0.5$, corresponding to position D on the curve of FIG. 4. Now Equation 1 becomes $$w_1(1.89)+w_2(2.31)+w_3(3.40) \\ +w_4(4.30)+w_5(3.56)=-0.5 \quad (3)$$

Proceeding in an analogous manner, other equations are generated which correspond to the other positions B, C, and E of the error signal in FIG. 4. This set of equations is:

$$w_1(1.75)+w_2(1.89)+w_3(2.31) \\ +w_4(3.40)+w_5(4.30)=-1.0 \quad (E)$$
$$w_1(1.89)+w_2(2.31)+w_3(3.40) \\ +w_4(4.30)+w_5(3.56)=-0.5 \quad (D)$$
$$w_1(2.31)+w_2(3.40)+w_3(4.30) \\ +w_4(3.56)+w_5(2.53)=0 \quad (A)$$
$$w_1(3.40)+w_2(4.30)+w_3(3.56) \\ +w_4(2.53)+w_5(1.80)=0.5 \quad (B)$$
$$w_1(4.30)+w_2(3.56)+w_3(2.53) \\ +w_4(1.80)+w_5(1.30)=1.0 \quad (C) \quad (4)$$

Solving this set of equations yields the values of $w_j$. The solution gives the error signal in the region C to E in FIG. 4 as the halo image moves across the sensors.

$$\text{Error signal}=0.374x_1-0.101x_2 \\ +0.065x_3+0.095x_4-0.451x_5 \quad (5)$$

Equation 5 was used to generate the general shape of the error signal by scanning the halo image. The central portion of the resulting error signal is shown in FIG. 6. Referring to FIG. 6, the abscissa represents halo displacement from the reference position and the ordinate represents the value of the error signal.

Photovoltaic silicon diodes were selected as the opto-electrical sensor devices to be used in this embodiment. These diodes produce an electrical output that is proportional to the intensity of radiation directed upon them.

Implementation of the weighing factors used to multiply individual diode sensor outputs and their summation is accomplished through the use of a differential amplifier. Referring to FIG. 3, diodes 61–65 are photovoltaic silicon diodes. The electrical outputs of the respective diodes are amplified by individual amplifiers 51–55, the outputs of which are applied by way of resistors 71–75 to differential amplifier 80. The values of the resistors 71–75 are proportional to the respective weighing factors $w_i$. Note that the signals corresponding to $x_2$ and $x_5$ are applied to the negative input of differential amplifier 80. Similarly, the signals corresponding to $x_1$, $x_3$ and $x_4$ are applied to the positive input of differential amplifier 80, thus accounting for the signs in Equation 5.

Each of the sections 41, 43 and 45 represents a single monitor. The sections 43 and 45 are functionally identical to section 41. Each monitor produces an electrical error signal of the general form shown in FIG. 6. The three monitors are positioned around the halo image 34 as shown in FIG. 2a. Referring to FIG. 7, monitor detection points A, B and C are shown positioned around halo 101 surrounding crystal rod 103. The reasons for the selection of three monitors and their respective positions will become more apparent as the following discussion develops.

The monitoring device generates an error signal proportional to the crystal rod diameter in the following manner. Monitors A and B (refer to FIG. 7) generate error signals as shown in FIG. 8. Note that the error signal generated by monitor A increases with positive displacement, and the error signal generated by monitor B decreases for positive displacement. Referring now to FIG. 9, the error signals of monitors A and B are shown superimposed upon a cross-section view of crystal rod 105. Note that the distance between monitors A and B is equal to the nominal diameter of the rod. By letting values of radius on the right, indicated by variable $x$, be positive, and the values of radius on the left, indicated by variable $y$, be negative, the error signal of each monitor can be written in polar form as follows:

$$E_B=-k(y+r_0) \\ E_A=k(x-r_0)$$

where $r_0$ is the nominal radius of the rod and $k$ is the slope of the error signal. Combining the signals gives $$E^{A+B}=k(x-y)-2kr_0 \quad (6)$$

When the diameter of the rod is correct, $x=r_0$ and $y=-r_0$. Substituting gives $$E^{A+B}=k(r_0+r_0)-2kr_0 \\ =0$$

There is no error signal.

Now let the rod radius increase by $\Delta$, i.e., $$x=r_0+\Delta \\ y=-(r_0+\Delta)$$

Equation 6 gives $$E^{A+B}=k(r_0+\Delta+r_0+\Delta)+2kr_0 \\ =2k\Delta$$

An error signal of $2k\Delta$ is generated. Similarly, an error signal of $-2k\Delta$ is generated if the diameter decreases by $\Delta$.

As the crystal rod is being pulled from the melt it may at times wobble slightly. The diameter of the crystal may not vary during this wobble, so it is desirable to eliminate the effects of wobble on a diameter sensor. Now consider the case where the wobble of the center of the rod is to the right by an amount $\Delta$, i.e., $$x=-r_0+\Delta \\ y=r_0+\Delta$$

Equation 6 gives $$E^{A+B}=k(r_0+\Delta+r_0-\Delta)-2kr_0 \\ =0$$

No error signal is generated. Similarly, no error signal is generated when the wobble is to the left by some amount $\Delta$. Thus, the 2-monitor system generates an error signal that depends on the change in the crystal diameter but not on the crystal wobble.

A good crystal may not be cylindrically symmetric. As such, the radius vector of the crystal diameter varies as a function of $\theta$, where $\theta$ is the angle through which the crystal has rotated during the pull with respect to some reference orientation. This orientation can be chosen as shown in FIG. 10. The radius-vector variation is then expressed as a Fourier series in terms of $\theta$ to give $$r=r_0+a_1\sin 1\theta+a_2\sin 2\theta+a_3\sin 3\theta+\ldots \quad (7)$$

Equation 7 also gives the value of $x$:

$$x=r_0+a_1\sin 1\theta+a_2\sin 2\theta+a_3\sin 3\theta+\ldots \quad (8)$$

The value of $y$ is obtained by letting $\theta$ equal $\theta + \pi$, since monitor B is displaced from monitor A by an angle $\pi$ about the crystal axis. Substituting $\theta + \pi$ for $\theta$ in Equation 7 and considering that the value of $y$ must be negative gives $$y = -(r_0 + a_1 \sin 1(\theta+\pi) + a_2 \sin 2(\theta+\pi) + a_3 \sin 3(\theta+\pi) + \ldots) \quad (9)$$

$$y = -(r_0 - a_1 \sin 1\theta + a_2 \sin 2\theta - a_3 \sin 3\theta + \ldots)$$

Substituting the values of $x$ and $y$ given by Equations 8 and 9 into Equation 6 gives the error signal $$E_5{}^{A+B} = 2ka_2 \sin 2\theta + 2ka_4 \sin 4\theta + \ldots \quad (10)$$

That is, the monitors disposed from each other by 180° about the crystal axis will eliminate the odd harmonics of the crystal asymmetry but not the even ones.

To assist in understanding the effect of changes in melt level on the signals generated by monitors A and B, reference should now be had to FIG. 11. The apparent change $S$ in the halo radius $r_0$ due to a change $m$ is melt level is given by the following equation $$S = r_0 - r_0 \cos \theta \quad (11)$$

where $$\theta = \sin^{-1} \frac{m \tan \Psi}{r_0}$$

$\Psi$ = look angle

Substituting and expanding gives $$S = r_0 - r_0 \left[ 1 - \left( \frac{m \tan \Psi}{r_0} \right)^2 \right]^{0.5} \quad (12)$$

Equation 12 was used to plot the apparent errors due to changes in melt level at various look angles. Two representative curves are shown in FIG. 12. Referring to FIG. 12, the abscissa represents change in melt level and the ordinate represents apparent change in the radius of the crystal rod. Curve 111 is plotted for a look angle of 30°; curve 113 is plotted for a look angle of 18° 26'. Note that there is essentially no error in the radius due to small changes in the melt level for small look angles. Thus the effect of changes in melt level on the error signal of monitors A and B can be ignored.

For the monitor in position C, the error $S_c$ in apparent radius caused by a change in melt level is $$S_c = m \tan \psi$$

This error is directly proportional to the change in melt level. The total error signal generated by monitor C is $$E^c = k(\Delta r + m \tan \psi)$$

By subtracting ½ $E^{A+B}$ from the output of monitor C the contribution of the change in radius to $E^c$ is removed and only the signal due to change in melt level remains. Thus the error signal for change in melt level is $$E_{\text{melt}} = E^c - \tfrac{1}{2} E^{A+B}$$

Referring now again to FIG. 3 the schematic of the circuit used to generate the error signals $E^{A+B}$ and $E_{\text{melt}}$ is shown. The signals 44 and 46, representing the outputs of the differential amplifiers for monitors A and B, are applied through equal resistors 81 and 82 to the input of amplifier 83. The output of amplifier 83 is the desired error signal $E^{A+B}$. This signal is applied by way of voltage divider 84, 85 to the negative input of differential amplifier 86. The input signal 88, which is the output of the differential amplifier for monitor C, is applied by way of resistor 87 to differential amplifier 86. The output of differential amplifier 86 is the error signal $E_{\text{melt}}$.

Experimental results reveal that the diameter control signal produced by the monitoring device is very accurate. Crystal rods of 2-inch nominal diameter were pulled, and the variance between actual diameter change and the error signal was used to calculate the standard deviation. The standard deviation was found to be 0.012 of an inch.

The present invention having been described in detail with reference to a specific embodiment thereof, it is understood that this description is intended only to serve as an illustration of the main features of the invention. Various modifications which fall within the inventive concept should now be apparent to those skilled in the art. The preferred embodiment having been described with reference to the pulling of silicon crystals, it is particularly noted that the ideas taught by the invention are equally applicable to the pulling of crystal rods of other suitable material, such as of germanium.

What is claimed is:

1. The method of monitoring growth parameters of a crystal growing from a melt comprising the steps of:
    (a) producing an image of the radiation halo around the growing crystal;
    (b) simultaneously sensing the radiation intensity at a plurality of points along a radius line of said halo image, at least some of said points being on each side of the peak intensity region of said halo image;
    (c) producing an electrical signal indicative of the radiation intensity sensed at each of said points;
    (d) combining said electrical signals to produce a single electrical signal indicative of the position of said radiation halo.

2. The method of claim 1 comprising the further steps of:
    (e) sensing the radiation intensity at a second plurality of points along an approximately opposite radius line of said halo image, at least some of said second plurality of points being on each side of the peak intensity region of said halo image;
    (f) producing an electrical signal indicative of the radiation intensities sensed at each of said second plurality of points,
    (g) combining said electrical signals from said second plurality of points to produce a second single electrical signal indicative of the position of said radiation halo;
    (h) combining said single signal and said second single signal to produce a combined signal indicative of changes in the diameter of said radiation halo.

3. The method of claim 1 further comprising the steps of:
    (e) sensing the radiation intensity at a second plurality of points along a radius line of said radiation halo which is approximately perpendicular to said first-mentioned radius line, at least some of said second plurality of points being on each side of the peak intensity region of said halo image;
    (f) producing an electrical signal indicative of the radiation intensity sensed at each of said second plurality of points;
    (g) combining said electrical signals from said second plurality of points to produce a second single electrical signal indicative of the position of said radiation halo;
    (h) combining said single electrical signal and said second single electrical signal to produce a differential signal indicative of changes in the level of the melt from which said crystal is growing.

4. The method of claim 2 further comprising the steps of:
    (i) sensing the radiation intensity at a third plurality of points along a radius line of said radiation halo which is approximately perpendicular to said first-mentioned radius line, at least some of said third plurality of points being on each side of the peak intensity region of said halo image;
    (j) producing an electrical signal indicative of the radiation intensity sensed at each of said third plurality of points;
    (k) combining said electrical signals from said third plurality of points to produce a third single electrical signal indicative of the position of said radiation halo;

(1) combining said combined signal and said third single electrical signal to produce a differential signal indicative of changes in the level of the melt from which said crystal is growing.

5. The method of claim 1 further comprising controlling the diameter of said crystal by changing the growth rate thereof in accordance with changes in said single electrical signal.

6. The method of claim 5 wherein changes in the growth rate of said crystal are produced by changing the rate of withdrawal of said crystal from said melt.

7. The method of claim 2 further comprising controlling the diameter of said crystal by changing the growth rate thereof in accordance with changes in said combined electrical signal.

8. The method of claim 7 wherein changes in the growth rate of said crystal are produced by changing the rate of withdrawal of said crystal from said melt.

9. The method claim 3 further comprising controlling the level of said melt by changing the elevation of the crucible containing said melt in accordance with changes in said differential signal.

10. The method of claim 4 further comprising controlling the diameter of said crystal by changing the growth rate of said crystal in accordance with said combined signal.

11. The method of claim 10 further comprising controlling the level of the melt in accordance with said differential signal.

12. The method of claim 11 wherein said growth rate is changed by changing the withdrawal rate of said crystal from said melt and said melt level is changed by changing the elevation of the crucible containing said melt.

13. In a crystal growing system a monitor/control system comprising:

(a) means to produce an image of the radiation halo surrounding a growing crystal;

(b) a group of sensor means arranged to simultaneously detect the radiation intensity at a plurality of points along a radius line of said halo image, at least some of said points being on each side of the point of peak radiation intensity of said halo image, each of said sensor means of said group arranged to produce an electrical signal indicative of the radiation intensity detected by said sensor;

(c) means to receive said electrical signals from each sensor of said group and to combine said signals in such relative proportions as to produce a single electrical signal which varies as a function of the changes in radius of said halo image.

14. A system as defined in claim 13 further comprising:

(d) means adapted to receive said single electrical signal and to control the withdrawal rate of said crystal from the melt in response to the received signal.

15. A system as defined in claim 13 further comprising:

(d) a second group of sensor means arranged to detect the radiation intensity at a plurality of points along a second radius line of said halo image which is approximately opposite said radius line, at least some of said points being on each side of the point of peak radiation intensity of said halo image, each said sensor means of said second group arranged to produce an electrical signal indicative of the radiation intensity detected by said sensor;

(e) means to receive said electrical signals from each sensor of said second group and to combine the received signals in such relative proportions as to produce a second single electrical signal which varies as a function of the changes in the radius of said halo image;

(f) means adapted to receive said single electrical signal and said second single electrical signal and to combine the received signals to produce a single combined signal which varies as a function of the diameter of said halo image.

16. A system as defined in claim 15 further comprising:

(g) means adapted to receive said single combined signal and to control the withdrawal rate of said crystal from the melt in response to said combined single signal.

17. A system as defined in claim 15 further comprising:

(g) a third group of sensor means arranged to detect the radiation intensity at a plurality of points along a third radius line of said halo image which is approximately perpendicular to said radius line and said second radius line, at least some of said points being on each side of the point of peak radiation intensity of said halo image, each of said sensor means of said third group arranged to produce an electrical signal indicative of the radiation intensity detected by said sensor;

(h) means to receive said electrical signals from each sensor of said third group and to combine said signals in such relative proportions as to produce a third single electrical signal which varies as a function of the change in radius of said halo image;

(i) means to receive said third single electrical signal and said combined single signal and to produce in response to the received signals a differential signal indicative of changes in level of the melt from which said crystal is growing.

18. A system as defined in claim 17 further comprising:

(j) means to receive said single combined signal and to control changes in the withdrawal rate of said crystal from the melt in accordance with changes in said single combined signal; and (k) means to receive said differential signal and to control changes in the melt level in accordance with changes in said differential signal.

References Cited

UNITED STATES PATENTS

| 2,979,386 | 4/1961 | Shockley et al. | 23—273 SP |
| 3,428,436 | 2/1969 | Tucker | 23—273 SP |
| 3,493,770 | 2/1970 | Dessauer et al. | 23—273 SP |

NORMAN YUDKOFF, Primary Examiner

S. SILVERBERG, Assistant Examiner

U.S. Cl. X.R.

23—273 SP, 215—217